United States Patent [19]

Armstrong

[11] 4,414,006
[45] Nov. 8, 1983

[54] AIR SEPARATION FOR AN OIL PUMP

[76] Inventor: Gary D. Armstrong, 2552 Albatross Way, Sacramento, Calif. 95815

[21] Appl. No.: 347,628

[22] Filed: Feb. 10, 1982

[51] Int. Cl.³ ............................................. B01D 19/00
[52] U.S. Cl. .......................................... 55/190; 55/203
[58] Field of Search ................................. 55/182–184, 55/189, 190, 199, 201, 203, 204

[56] References Cited

U.S. PATENT DOCUMENTS

| | | | |
|---|---|---|---|
| 1,143,957 | 6/1915 | Hansen | 55/199 |
| 2,278,397 | 3/1942 | Scheibe et al. | 55/199 |
| 2,575,315 | 11/1951 | Edwards | 55/199 X |
| 2,575,568 | 11/1951 | Topanelian, Jr. | 55/199 |
| 2,952,329 | 9/1960 | Cunningham et al. | 55/199 |
| 3,686,831 | 8/1972 | Libby | 55/199 |
| 3,758,085 | 9/1973 | Mentschel | 55/230 X |
| 3,932,063 | 1/1976 | Butler | 55/406 X |
| 4,042,351 | 8/1977 | Anderson | 55/184 X |
| 4,088,459 | 5/1978 | Tuzson | 55/203 |
| 4,093,397 | 6/1978 | Lovelady | 55/320 X |
| 4,113,452 | 9/1978 | Brown et al. | 55/203 |
| 4,182,480 | 1/1980 | Theyse et al. | 55/203 X |
| 4,222,751 | 9/1980 | Shunta | 55/182 X |

FOREIGN PATENT DOCUMENTS

| | | | |
|---|---|---|---|
| 1923826 | 1/1970 | Fed. Rep. of Germany | 55/189 |
| 2743391 | 3/1979 | Fed. Rep. of Germany | 55/199 |
| 362874 | 9/1938 | Italy | 55/199 |
| 466028 | 6/1975 | U.S.S.R. | 55/182 |

*Primary Examiner*—Robert H. Spitzer
*Attorney, Agent, or Firm*—Blair, Brown & Kreten

[57] ABSTRACT

An air separator for removing air from aerated oil with an impeller on a disc mounted on a hollow drive shaft within an impeller chamber, so that oil which enters the impeller chamber is impacted by the impeller disc, causing cavitation so that deaerated oil is driven from the chamber by centrifugal force while the eliminated air is collected through apertures in the hollow drive shaft and thereafter vented.

3 Claims, 3 Drawing Figures

U.S. Patent   Nov. 8, 1983   4,414,006
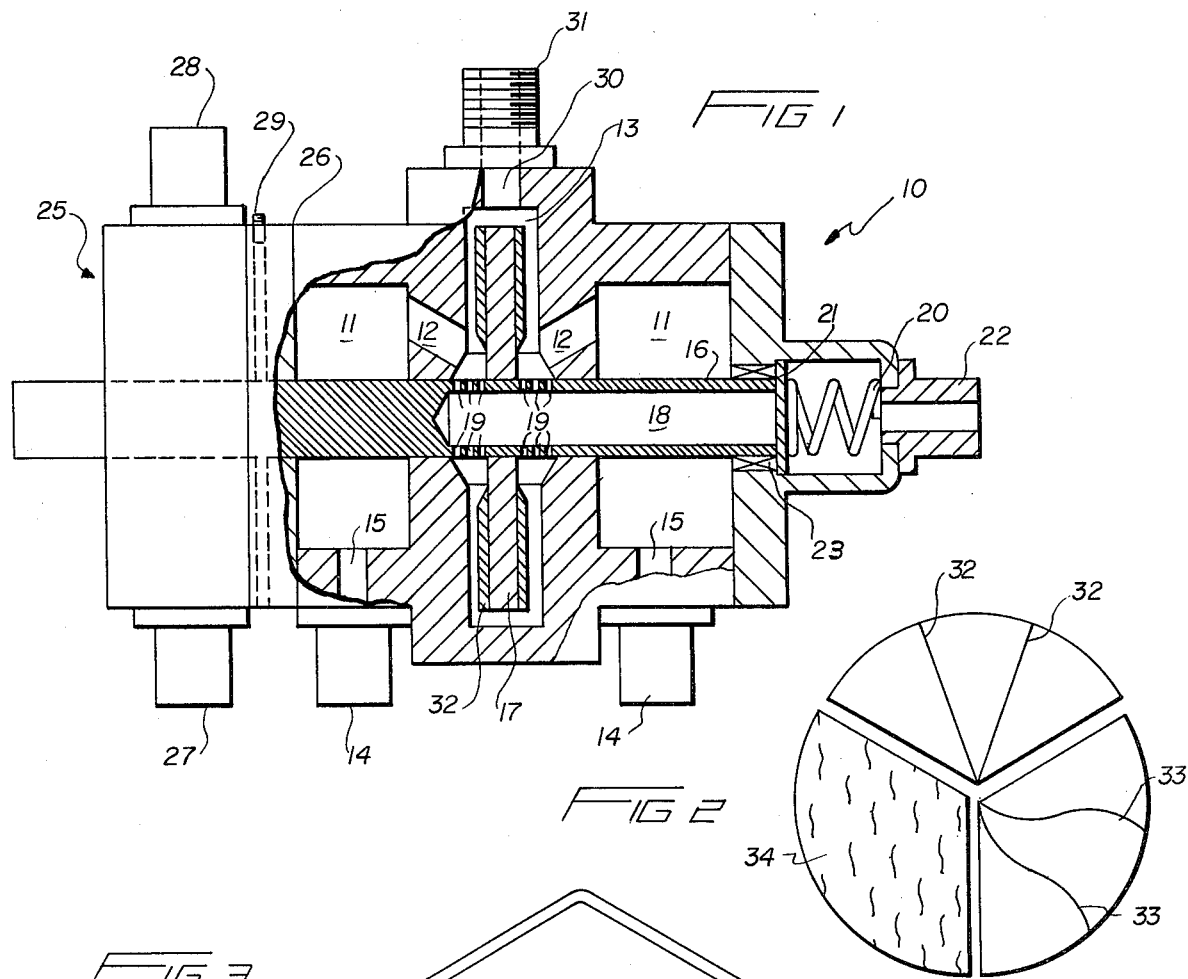
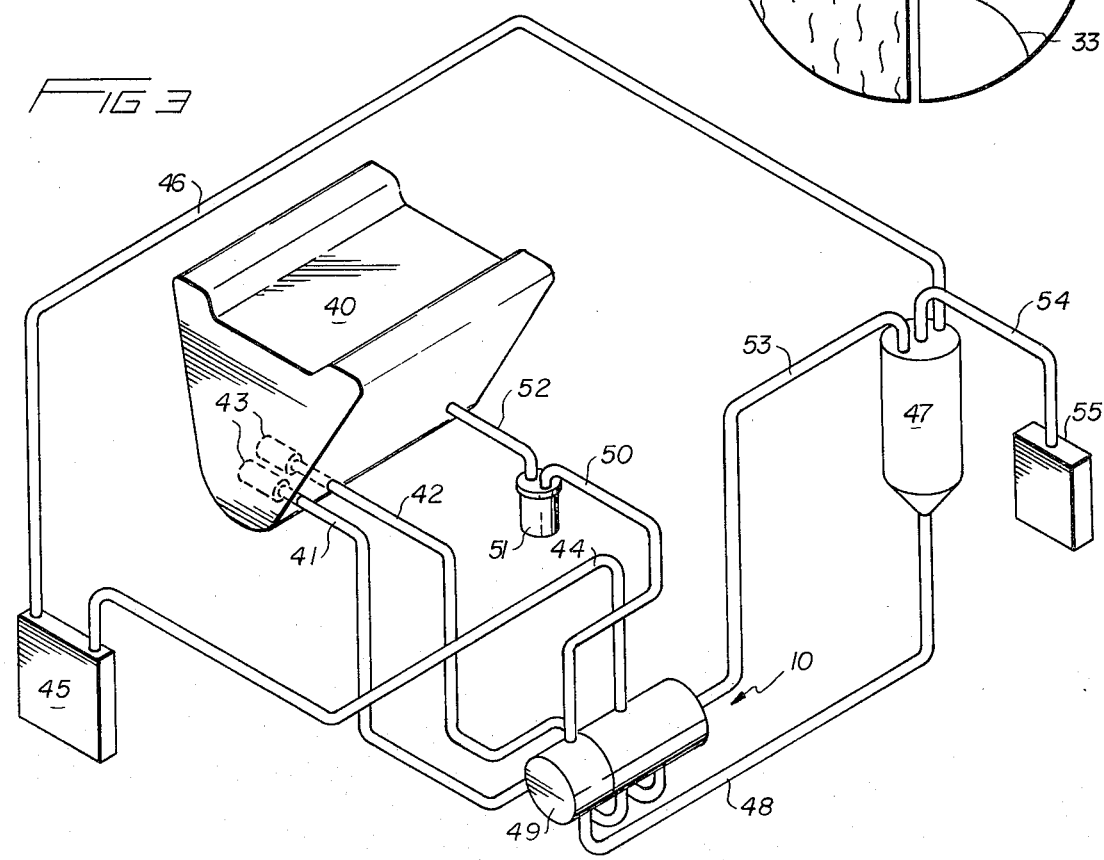

AIR SEPARATION FOR AN OIL PUMP

BACKGROUND OF THE INVENTION

This invention relates generally to fluid pumps which separate gases mixed with the fluids.

More specifically, the instant invention relates to a dry sump oil pump system for automobiles which separates air suspended in the oil which results from a frothing that takes place under the strain of high performance. Furthermore, the instant invention relates to a system of pumping and processing engine oil which ensures that all of the oil is circulated through the entire system and none lingers in different components of the motor, so that the oil can be beneficially recirculated.

Dry sump oil pump systems for automobiles are well known in the prior art. Those who seek improved performance from an automobile such as racers are aware of the advantages that a dry sump system offers over a conventional oil system. In terms of horsepower, reliability and space, even the simpliest dry sump systems offer improvements over the best wet sump. A dry sump system ensures the complete circulation of all the oil in the system thereby accessing the oil to various filters. Furthermore, the oil has a tendency to migrate in the pan in a wet sump system thus the scavange tube may suck air and not oil which leads to engine failure. Therefore, a dry sump system is an integral part of a high performance vehicle such as a race car.

This is well understood in the prior art. However, a further problem exists. High performance vehicles cause a severe foaming and frothing of the circulated oil. Oil with a high percentage of air aerated therein, is less viscous and more likely to suffer breakdown under grueling conditions. Oil breakdown and loss of viscosity results in the failure of engine components which ultimately leads to complete engine failure, and in the case of a racer a disqualification.

Prior art dry sump systems rely upon the misconception that oil drawn from the very bottom of a separate reservoir will have had time to allow the air to separate from the oil. However, studies have shown that aerated oil remains frothy for quite a long period of time, and recirculating oil in this state can result in engine failure when subjected to the demands of high performance. Therefore, a strong felt yet unfulfilled need exists for an apparatus according to the instant invention which separates the air from the oil by means of an impeller and its associated shaft eliminating the air while returning the oil to a reservoir from which the oil pump draws.

The following patents reflect the state of the art of which applicant is aware insofar as they appear to be germane to the patent process:

| 3,686,831 | Libby | 4,088,459 | Tazon |
| 3,932,063 | Butler | 4,093,397 | Lovelady |
| 3,758,085 | Metschel | | |

Of the references cited, the patent to Libby appears to be the closest to the instant invention, since he teaches the use of a centrifuge type separator wherein a gas and a liquid are introduced along an inlet port 54 and thereafter are caused to translate axially relative to a shaft 50. Thereafter, vanes or impellers 58 cause the liquid to extend outwardly to chamber 60 while the gas continues along parallel to the axis of the shaft and is emitted at passageway 88.

Similarly, the patent to Butler teaches the use of a liquid pump in which a liquid and a gas are introduced in portal 18 and the gas is allowed to escape along passageway 20, while the liquid is thrown outwardly, traveling out of conduit 26.

The remaining references show the state of the art further.

The instant invention is distinguished in that none of the references teach the use of an oil foam separator wherein the need for a gas outlet port has been eliminated by providing apertures on the center of the shaft forming the centrifuge so that gas escapes along the length of the shaft. Furthermore, none of the references teach or render obvious the sandwich construction in which scavanging stages are provided on opposed sides of the centrifuge. Also, the unique configuration of the propeller disc wherein vanes may be completely excluded is not taught in any of the references.

SUMMARY AND OBJECTS OF THE INVENTION

Accordingly, a primary object of the present invention is to provide a novel apparatus for separating and eliminating the air from aerated, foamy oil and returning the oil to an oil reservoir in a dry sump pump system in an automobile.

It is yet another object of the present invention to provide a novel apparatus which is easily retrofitted to be used in conjunction with conventional oil pumps in a dry sump system.

Still another object of the present invention is to provide a novel apparatus for separating the air from aerated oil which is small, lightweight, and compact so as to provide an advantage in a high performance racing machine.

It is a further object of the present invention to provide a novel apparatus for separating air from aerated oil which helps maintain a uniform viscosity for the lubricant and thereby prolongs engine life.

The objects stated above and other related objects are accomplished by the provision of a hollow shaft with an impeller which spins within a chamber into which aerated oil flows. The impact of the impeller on the oil in the chamber creates a centrifuge effect and causes the oil to migrate away from the shaft and the air to migrate toward a hollow shaft provided with a plurality of apertures to collect the air and eliminate it from the oil.

Other objects and advantages of the invention will become apparent when viewed in light of the following description in conjunction with the accompanying drawings.

BRIEF DESCRIPTION OF THE DRAWING FIGURES

FIG. 1 is a partial sectional view of the device.

FIG. 2 is a fragmented plan view of the impeller disc showing three different embodiments.

FIG. 3 is a perspective view of a dry sump oil pump system.

DESCRIPTION OF THE PREFERRED EMBODIMENT

Referring now to the drawings in detail, wherein like reference numerals represent like parts throughout the several figures, reference numeral 10 refers generally to the body of the apparatus according to the instant invention.

The interior of the body 10 has two intake chambers 11 on either side of a central, arcuate impeller chamber 13. The two radially inward intake chambers 11 are connected to the impeller chamber 13 by two slanting intake ports 12. Two intake fittings 14 appearing on the exterior of the body 10 are connected to the intake chambers 11 by intake passageways 15. A drive shaft 16 runs through and to the two intake chambers 11 and the impeller chamber 13. An impeller disc 17 is affixed to the drive shaft 16 in such a manner that it may spin freely within the impeller chamber 13. The drive shaft 16 has a hollow core portion 18 running longitudinally inside the shaft 16 from one body extremity to an area beneath the position of the impeller disc 17. A series of exhaust apertures 19 are provided in the drive shaft 16 proximate to the impeller disc 17. These apertures 19 provide a means of egress for air in the impeller chamber 13 to the hollow core portion 18 of the drive shaft 16.

A spring loaded pressure responsive valve, consisting of a spring 20 and a diaphragm 21, covers the opening to the hollow portion 18 of the drive shaft 16 in order to create a back pressure in the hollow portion 18 of the drive shaft 16. The amount of back pressure can be controlled by removing an air outlet fitting 22 and installing a different capacity spring 20. Both ends of the drive shaft 16 with the hollow portion 18 are supported by bearings 23. The opposite end of the drive shaft 16 is supported in the body of a conventional oil pump generally referred to by reference numeral 25, which mates with the body 10 of the air separator along a side face 26 thereof.

The conventional oil pump 25 has an intake fitting 27, an output fitting 28, and an adjustment screw 29 to vary the oil pressure.

At the top of the impeller chamber 13 is an output passageway 30 and an output fitting 31, which in combination receive the oil which has had air removed from it. The impeller disc 17, can appear in at least the three different embodiments shown in FIG. 2. In one embodiment a series of straight vanes 32 appear on the surface of the impeller disc 17. The vanes may also be arcuate as shown by reference numeral 33 in FIG. 2. In a third embodiment, the impeller disc 17 has no vanes but has textured surfaces 34 FIG. 2. The vaned versions may also have textured surfaces.

In operation, aerated oil enters the intake chambers 11 until it fills them and then overflows through the intake ports 12 to the impeller chamber 13. The spinning of the impeller disc 17 and its associated vanes 32 and 33 causes the phenomenon known as cavitation to occur. The vanes 32 and 33 or the texture surface 34 of the disc 17 impact the oil in the chamber 13, causing the oil to be separated from the air. The centrifugal effect drives the oil out the output passage 30 in the top of the chamber 13. However, the air is drawn towards the drive shaft and exits the chamber 13 through the apertures 19 into the hollow portion 18 of the drive shaft 16. Thereafter, when the pressure inside the hollow portion of the drive shaft 16 builds up to a point that exceeds the capacity of the spring 20, then the air exits from the hollow portion 18 of the drive shaft 16 past the valve 21 and through the fitting 22.

FIG. 3 depicts a dry sump oil system for a high performance machine wherein reference numeral 10 refers generally to the device according to the instant application. In operation, oil is drawn from the bottom of oil sump 40 through the two intake lines 41 and 42 which have screen filters 43, to the intake chambers 11 FIG. 1 and thereafter to the impeller chamber 13 which separates the air from the oil. The treated oil is sent out through the output oil line 44 FIG. 3 to the oil cooler 45 through output fitting 31. After it is cooled, the oil proceeds through the oil line 46 to the oil reservoir 47. Oil is drawn from the bottom of the oil reservoir 47 by an oil line 48 which feeds the oil pump 49. From there the oil is forced through oil line 50 to the oil filter 51, and then back through the oil line 52 to the engine 40. The air that is separated from the oil is forced out of the device 10 through vent line 53 and valve 21 to the reservoir 47, so that any oil vapor contained in the air can settle out in the oil reservoir. The oil reservoir 47 also has a vent line 54 and a vent tank 55.

Having thus described the preferred embodiment of the invention, it should be understood that numerous structural modifications and adaptations may be resorted to without departing from the spirit of the invention.

What is claimed is:

1. A device for separating air from oil or the like comprising in combination:
   an oil/air inlet means,
   means for directing the oil/air to said device,
   separating means for moving the oil substantially radially outwardly while directing the air substantially radially inwardly,
   an oil outlet for emitting the oil,
   and venting means for emitting the air,
   wherein said separating means includes an impeller disc mounting on a driven shaft,
   wherein said driven shaft is provided with plural apertures for air migration, said shaft including a hollow core,
   wherein said core communicates with said venting means for air discharge, said venting means including an air pressure sensitive diaphragm proximate to a shaft end,
   wherein said diaphragm is responsive to biasing means for back pressure,
   wherein said directing means include oil/air intake chamber which store a quantum of the air/oil received from said air/oil inlet means,
   wherein said air/oil intake chamber communicates with said impeller via a radially inwardly sloped intake port including a pair of said intake chambers, ports, and inlet means on opposed face of said impeller which is housed in an associated impeller chamber.

2. The device of claim 1 wherein said impeller includes textured surfaces.

3. The device of claim 2 wherein said impeller includes vane means thereon.

* * * * *